United States Patent [19]

Haaf et al.

[11] 4,332,714

[45] Jun. 1, 1982

[54] DRIP-RETARDANT PLASTICIZED POLYPHENYLENE ETHER COMPOSITIONS CONTAINING MICROFIBRILLAR POLY(TETRAFLUOROETHYLENE)

[75] Inventors: William R. Haaf, Voorhesville; Gim F. Lee, Jr.; Robert A. Williams, both of Albany, all of N.Y.

[73] Assignee: General Electric Company, Pittsfield, Mass.

[21] Appl. No.: 902,411

[22] Filed: May 3, 1978

Related U.S. Application Data

[63] Continuation of Ser. No. 753,511, Dec. 21, 1976, abandoned.

[51] Int. Cl.$^3$ .................. C08L 53/00; C08F 8/00; C08L 71/04; C08K 5/52
[52] U.S. Cl. .................................... 524/141; 524/502; 524/505; 524/142; 524/143; 525/64; 525/68; 525/92; 525/93; 525/132; 525/133; 525/151; 524/144; 524/145
[58] Field of Search .......... 260/4 AR, 45.7 R, 45.7 P, 260/45.95, 30.6 R; 525/1, 3, 68, 64, 132, 133, 905, 176

[56] References Cited

U.S. PATENT DOCUMENTS

| | | | |
|---|---|---|---|
| 3,671,487 | 6/1972 | Abolins | 260/40 R |
| 3,794,606 | 2/1974 | Bennett et al. | 260/4 R |
| 3,809,729 | 5/1974 | Reinhard | 260/45.7 P |
| 3,993,621 | 11/1976 | McInerney et al. | 260/42.18 |
| 4,107,232 | 8/1978 | Haaf et al. | 525/1 |
| 4,128,602 | 12/1978 | Katchman et al. | 525/68 |
| 4,128,603 | 12/1978 | Katchman et al. | 525/68 |
| 4,128,604 | 12/1978 | Katchman et al. | 525/68 |

FOREIGN PATENT DOCUMENTS 2433966 2/1975 Fed. Rep. of Germany.
2554324 6/1976 Fed. Rep. of Germany.
1459648 12/1976 United Kingdom.

*Primary Examiner*—Herbert J. Lilling
*Attorney, Agent, or Firm*—Hedman, Casella, Gibson & Costigan

[57] ABSTRACT

There are provided drip-retardant, plasticized thermoplastic compositions which comprise, in admixture, a polyphenylene ether resin, a plasticizer in an amount at least sufficient to provide a plasticized composition after molding, and a microfibrillar poly(tetrafluoroethylene)resin in an amount at least sufficient to render the thermoplastic composition non-dripping when molten. The present compositions meet even more stringent standards than the UL-94 flame test.

15 Claims, No Drawings

DRIP-RETARDANT PLASTICIZED POLYPHENYLENE ETHER COMPOSITIONS CONTAINING MICROFIBRILLAR POLY(TETRAFLUOROETHYLENE)

CROSS-REFERENCE TO RELATED APPLICATION

This is a continuation of application Ser. No. 753,511, filed Dec. 21, 1976, now abandoned.

The present invention relates to plasticized thermoplastic polyphenylene ether compositions which contain, as a surprisingly effective drip-retardant additive, a microfibrillar poly(tetrafluoroethylene)resin. The compositions of this invention possess improved drip retardancy even when subjected to stringent test conditions which more closely simulate real large-scale fire situations than prior art test methods. The present compositions can optionally include impact modifiers for the polyphenylene ether resin, such as A-B-A[1] block copolymers, e.g., polystyrene-polybutadiene-polystyrene.

BACKGROUND OF THE ART

The polyphenylene ether resins are well known in the art as a class of thermoplastics which possess a number of outstanding physical properties. They can be prepared, in general, by oxidative and non-oxidative methods, such as are disclosed, for example, in Hay, U.S. Pat. Nos. 3,306,874 and 3,306,875 and Stamatoff, U.S. Pat. Nos. 3,257,357 and 3,257,358, which are incorporated herein by reference.

It is known that when the polyphenylene ether resins are combined with styrene resins, such as crystal grade homopolystyrene or high impact rubber modified polystyrene, there are obtained compositions having many properties which are improved over those of either the polyphenylene ether or polystyrene alone. Moreover, these respective polymers are combinable in virtually all proportions, e.g., from 1 to 99 parts of polyphenylene ether to 99 to 1 parts of polystyrene. Examples of polyphenylene ether-polystyrene compositions are disclosed in Cizek, U.S. Pat. No. 3,383,435, which is incorporated herein by reference.

In recent years, there has been increasing concern about the performance and safety of thermoplastic materials, including the afore-mentioned polyphenylene compositions during real-life fire situation. One of the potential hazards presented by the presence of thermoplastics in fires is that they can contribute to fire spread by dripping flaming and/or molten resin.

The term "dripping" has an art-recognized meaning. More particularly, in a fire situation, a thermoplastic can become hot enough to exhibit some degree of melt flow. When this flow is extensive enough to result in the physical separation of the molten mass from the main body of the plastic, "dripping" is said to have taken place. Because the dripped material is sometimes flaming and since dripped flaming resin is a means by which fire can spread to combustible surroundings, dripping is undesirable in a thermoplastic material.

Of particular interest herein are plasticized thermoplastic compositions comprised of a polyphenylene ether resin, plasticizer(s) present in plasticizing amounts, and optionally, impact modifiers such as rubber-modified, high-impact polystyrene resins or A-B-A[1] block elastomeric copolymers. These compositions have now been investigated under test conditions which are even more closely related to real-life large-scale fire conditions than are more conventional and more widely used tests such as the Underwriters Laboratories Bulletin No. 94 critical burning test.

The UL-94 test is generally carried out by preparing a molded test piece of about $5'' \times \frac{1}{2}'' \times 1/16''$, supporting the sample vertically, and igniting it. If the sample does not form flowing droplets sufficient to ignite a piece of cotton held 12 inches beneath and extinguishes itself within an average of 5 seconds after each of two 10-second ignitions, the composition is deemed to be non-dripping and flame-retardant to the point where it satisfies the V-0 requirements of the Underwriters' Laboratories. If the test sample extinguishes itself within 30 seconds, after two 10-second ignitions, the composition is deemed to be flame-retardant and non-dripping in satisfaction of the V-1 requirements.

Because the heat flux generated during the usual Underwriters Laboratories Bulletin No. 94 test is relatively small in comparison with heat flow which prevails during real, large-scale fires, the following test has now been devised which more closely simulates reality than the UL-94 test:

The barrel of a Bunsen burner is screwed down (clockwise) so that the air ports are closed. The gas flow is adjusted to produce a blue/yellow flame of approximately 5-6 inches in height. A $5'' \times \frac{1}{2}'' \times 1/16''$ test sample is suspended vertically in the center of the flame and about $\frac{3}{8}''$ above the burner top, until either dripping takes place or 5 minutes of continuous ignition time has elapsed.

The above procedure is hereinafter referred to as the "flame bath" test, because the test specimen is literally immersed in flames during the test.

It has now been surprisingly discovered that the "dripping" (as measured by both the 1/16" UL-94 and "flame bath" tests) of plasticized compositions of a polyphenylene ether resin and a plasticizer can be greatly retarded or completely prevented by the incorporation of microfibrillar poly(tetrafluoroethylene), in relatively small amounts. It has been previously proposed, in co-pending U.S. application Ser. No. 530,373, filed Dec. 6, 1974, assigned to the same assignee as herein, that poly(tetrafluoroethylene) acts as an effective drip-retarding agent for self-extinguishing polyphenylene ether compositions which contain flame retarding agents. However, it has not been previously recognized that a particular kind of poly(tetrafluoroethylene), namely microfibrillar poly(tetrafluoroethylene), is a remarkably effective drip-retarding agent in plasticized polyphenylene ether compositions, even in the absence of flame retarding additives.

DESCRIPTION OF THE INVENTION

Accordingly, the present invention provides in its broadest aspects, a drip-retardant plasticized thermoplastic composition which comprises, in admixture:
(a) a polyphenylene ether resin;
(b) a plasticizer in an amount at least sufficient to provide a plasticized composition after molding; and
(c) a microfibrillar poly(tetrafluoroethylene) resin in an amount at least sufficient to render said thermoplastic composition non-dripping when molten and/or burning.

As employed herein the term "plasticized" is used to describe compositions having a sufficient amount of a plasticizer which reduces the temperature required for extrusion by at least 50° to 100° F. as compared to the analagous unplasticized compositions.

The polyphenylene ether resin (a) is preferably of the type having the structural formula:

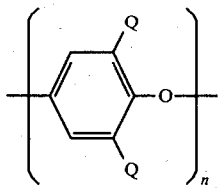

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

A more preferred class of polyphenylene ether resins for the compositions of this invention includes those of the above formula wherein each Q is alkyl, most preferably having from 1 to 4 carbon atoms. Illustratively, members of this class include poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

Especially preferred is poly(2,6-dimethyl-1,4-phenylene)ether, preferably having an intrinsic viscosity of about 0.45 deciliters per gram (dl./g.) as measured in chloroform at 30° C.

The choice of a plasticizer is not critical and any of the conventional materials used for this purpose can be employed. Preferably, component (b) will be selected from among phthalate and phosphate plasticizing materials, and especially phosphate plasticizers.

The phosphate plasticizer is preferably a compound of the formula:

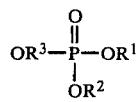

wherein $R^1$, $R^2$ and $R^3$ are the same or different and are alkyl, cycloalkyl, aryl, alkyl substituted aryl, aryl substituted alkyl, hydroxyalkyl, hydroxyaryl, hydroxyalkaryl, halogen, haloaryl, hydrogen and halogen substituted aryl.

Examples include cresyl diphenyl phosphate, 2-ethylhexyl diphenyl phosphate, tricresyl phosphate, triisopropylphenyl phosphate, triphenyl phosphate, triethyl phosphate, dibutyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2-ethylhexyl phenyl and tri-2-ethylhexyl phosphate tri(polychlorophenyl) phosphate or mixtures thereof. Especially preferred is triphenyl phosphate.

Examples of phthalate plasticizers include dibenzyl phthalate, phenyl cresyl phthalate, diethyl phthalate, dimethyl phthalate, phenyl benzyl phthalate, butyl benzyl phthalate, butyl cyclohexyl phthalate, dibutyl phthalate, octyl cresyl phthalate, diphenyl phthalate, di-n-hexyl phthalate, disohexyl phthalate, butyl octyl phthalate, butyl decyl phthalate, diisooctyl phthalate, di-2-ethylhexyl phthalate, di-n-octyl phthalate, diisononyl phthalate, diisodecyl phthalate, di-2-propyl heptyl phthalate, di-n-nonyl phthalate, di-n-decyl phthalate and ditridecyl phthalate.

The plasticizer (b) is added in amounts which will be sufficient to provide a plasticized composition within the meaning of the term described above. In general, the plasticizer is present in amounts ranging from about 15 to about 65 parts of plasticizer per 100 parts of total resin. Preferably, from about 20 to about 45 parts of plasticizer per 100 parts of total resin are employed.

The drip-retarding additive (c) of the present positions must be a microfibrillar poly(tetrafluoroethylene) resin. By "microfibrillar", it is meant that the resin forms microfibrils upon being rubbed between the palms of one's hand. Such resins are commercially available or can be prepared by known methods. An example of a commercially available microfibrillar polytetrafluoroethylene resin is TEFLON Type 6, sold by the DuPont Company.

Amounts of the microfibrillar poly(tetrafluoroethylene) resin will vary, depending on the particular needs of the composition, it being essential only that a sufficient amount is added to render the composition non-dripping or drip-retardant in accordance with the above-mentioned UL-94 test and more severe "flame bath" test. In general, amounts are selected which range from about 0.1 to about 5 parts per 100 parts of the composition, preferably from about 0.5 to about 1 part per 100 parts of the composition, based on components (a) and (b) combined.

The present compositions can also include impact modifiers, such as polystyrene resins which have been blended or co-polymerized with materials which are elastomeric at room temperature, e.g., 20° to 25° C.

The preferred styrene resins will be those having at least 25% by weight of repeating units derived from a vinyl aromatic compounds of the formula:

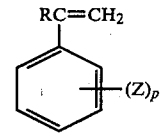

wherein R is hydrogen, (lower) alkyl or halogen; Z is vinyl, halogen or (lower) alkyl; and p is 0 or an integer of from 1 to the number of replaceable hydrogen atoms on the benzene nucleus. Herein the term "(lower)alkyl" means alkyl from 1 to 6 carbon atoms.

The general formula above includes, by way of illustration, homopolymers such as homopolystyrene and monochloropolystyrene, the modified polystyrenes, such as rubber modified high impact polystyrene, i.e., polystyrene which has been blended or grafted with natural or synthetic elastomers such as polybutadiene, styrene-butadiene, EPDM rubber, and the like, and styrene containing copolymers such as the styrene acrylonitrile copolymers, styrene butadiene copolymers, styrene acrylonitrile-α-alkyl styrene copolymers, styrene-acrylonitrile-butadiene copolymers, poly-α-methyl-styrene, copolymers of ethylvinylbenzene, divinylbenzene and styrene maleic anhydride copolymers, and block copolymers of styrene-butadiene and styrene-butadienestyrene.

Preferred impact modifiers include A-B-A$^1$ block copolymers. In general, these resins comprise a polymerized center block B which is derived from a conjugated diene, e.g., butadiene, isoprene, 1,3-pentadiene, and the like, and polymerized terminal blocks A and A$^1$ which are derived from vinyl aromatic compounds, e.g., styrene, α-methyl styrene, vinyl toluene, vinyl xylene, vinyl naphthalene, and the like. Preferably, the A-B-A$^1$ block copolymer will have terminal blocks A and A$^1$ comprised of polystyrene and a center block comprised of polybutadiene.

The linear A-B-A$^1$ block copolymers are made by an organometallic initiated polymerization process using, for example, sodium or lithium metal or an organic derivative thereof. The diene monomers can be polymerized with a monofunctional or difunctional initiator, as is described in Kennedy et al, Interscience Publishers, Vol. 23, Part II (1969), pages 553-559. Other methods of preparing these block copolymers are described in Zelinski, U.S. Pat. No. 3,251,905 and Holden et al, U.S. Pat. No. 3,231,635, the disclosures of which are incorporated herein by reference to save unnecessary detail.

Commercially available A-B-A$^1$ block copolymers include Kraton X-4119, a polystyrene-polybutadiene-polystyrene block copolymer containing 20 weight % of mineral oil, and the Kratons designated as K-1101 (polystyrene polybutadiene-polystyrene), K-1102 (polystyrene-polybutadiene-polystyrene), and K-1107 (polystyrene-polyisoprene-polystyrene), all from Shell Chemical Co., Polymers Division.

Hydrogenated A-B-A$^1$ block copolymers can also be used as impact modifiers in the present compositions. These are prepared by techniques which are well known in the art. See, for instance, the disclosure in Jones, U.S. Pat. No. 3,431,323, which is incorporated herein by reference. A preferred commercially available copolymer of this type is Shell Chemical's KG-6521 resin.

If an impact modifier is employed it should be employed at about 3 to 15 parts by weight per 100 parts by weight of components (a) and (b).

A preferred family of compositions will include a flame retardant amount of a flame retardant agent. Obviously, the flame retardant agent can comprise plasticizer component (b) if (b) itself is a flame retardant and is present in flame retardant amounts.

Other ingredients, such as fillers, reinforcements, pigments, stabilizers, lubricants, and the like may be added for their conventional purposes.

The manner in which the present compositions are prepared is not critical and conventional methods can be employed. Preferably, however, each of the ingredients is added as part of a blend premix, and the latter is passed through an extruder at an extrusion temperature of from about 450° to about 550° F., dependent on the needs of the particular composition. The strands emerging from the extruder may be cooled, chopped into pellets, and molded or calendered to any desired shape.

DESCRIPTION OF THE PREFERRED EMBODIMENTS

The following examples are illustrative of the compositions of this invention. They are not intended to limit the invention in any manner.

EXAMPLES 1-11

The following blends were prepared and tested for flame retardancy. All parts are by weight.

| Example | Poly(2,6-dimethyl-1,4-phenylene)ether | TPP$^a$ | Decabromodi-phenyl ether | A—B—A$^1$ block copolymer$^b$ | Hydrogenated A—B—A$^1$ block copolymer$^c$ | PE$^d$ | PTFE$^e$ |
|---|---|---|---|---|---|---|---|
| 1 | 70 | 30 | — | — | — | — | — |
| 2 | 70 | 30 | — | — | — | — | 1.0 |
| 3 | 70 | 30 | 20 | — | — | — | — |
| 4 | 70 | 30 | 20 | — | — | — | 1.0 |
| 5* | 80 | 20 | — | .5 | — | — | — |
| 6* | 80 | 20 | — | 5 | — | — | 0.5 |
| 7* | 80 | 20 | — | 5 | — | — | 1.0 |
| 8* | 80 | 20 | — | — | 5 | — | — |
| 9* | 80 | 20 | — | — | 5 | — | 0.5 |
| 10 | 85 | 15 | — | — | 5 | 3 | — |
| 11 | 85 | 15 | — | — | 5 | 3 | 1.0 |

$^a$triphenylphosphate
$^b$K1011, Shell Chemical Co.
$^c$KG 6521, Shell Chemical Co.
$^d$polyethylene
$^e$microfibrillar poly(tetrafluoroethylene), TEFLON 6, DuPont Co.
*also contain 0.5 parts tridecylphosphite, 0.15 parts zinc sulfide and 0.15 parts zinc oxide The dripping test results and flame retarding properties for the above compositions are shown in the following table.

TABLE

FLAME TEST RESULTS

| Example | Oxygen Index | 1/16" UL-94 (sec/sec.) | "Flame Bath" |
|---|---|---|---|
| 1 | — | 1/2, 1/3, 1/2 1/3 drip, 1/2 | Dripping after 16-18 seconds of exposure |
| 2 | — | 0/0, 0/2, 1/2, 0/1, 0/1 | Dripping after 55-65 seconds |
| 3 | — | 0/0, 0/0, 0/1, 0/0, 0/0 | Dripping after 21-25 seconds |
| 4 | — | 0/0, 0/0, 0/0, 0/0, 0/0 | Dripping after 80-84 seconds |
| 5 | 0.386 | 0/2, 1/1, 1/1, 1/1, 0/1 | Dripping after 50-55 seconds |
| 6 | 0.338 | 0/1, 0/2, 0/1, 0/1, 0/1 | No dripping during first 300 seconds of ignition; during that time, test sample shriveled |

TABLE-continued

| | FLAME TEST RESULTS | | |
|---|---|---|---|
| Example | Oxygen Index | 1/16" UL-94 (sec/sec.) | "Flame Bath" |
| 7 | 0.355 | 1/0, 0/2, 0/0, 0/1, 0/0 | up and burned to form a solid, high integrity char Same results as for Example 6 |
| 8 | — | 1/1, 1/1, 0/1, 1/1, 0/1 | Dripping after 55 seconds |
| 9 | — | 0/1, 0/1, 0/1 0/0, 0/1 | Same results as for Example 6 |
| 10 | — | — | Dripping after 36 seconds |
| 11 | — | — | Same results as for Example 6 |

It was of further interest to learn whether or not compositions containing microfibrillar poly(tetrafluoroethylene) would also resist dripping in the presence of radiant heat alone, that is, in the molten state and in the absence of char-promoting flame. Just as in the case of a flame-producing fire, a thermoplastic material which drips in the presence of radiant heat is also hazardous. The dripping behavior of thermoplastics in the presence of radiant heat was evaluated using the following test procedure:

A test specimen measuring 5"×½"×1/16" was clamped at its top edge and held vertically with its 5"×½" surface parallel to a radiant panel located about 2¼" away. A weight of 42.0 grams was clamped to its bottom edge to prevent "curling", i.e., physical distortion by bending or twisting, of the test specimen under the influence of radiant heat. The temperature at the surface of the test specimen was estimated to be 250° C.

Under these test conditions, a slight surface charring took place on the test specimen, but no flaming of the specimens occurred at any time.

A composition made up of 80 parts of poly(2,6-dimethyl-1,4-phenylene)ether resin, 20 parts of triphenylphosphate and 5.0 parts of K1101 styrene-butadiene-styrene block copolymer was tested using the above procedure, and dripping occurred after 55 seconds of exposure to the heated panel. The same composition was tested again, except that 0.5 parts of microfibrillar poly(tetrafluoroethylene), TEFLON 6 was added. With this composition, dripping did not occur until 242 seconds of exposure had elapsed. The test was again repeated using 1.0 parts of TEFLON 6 in the composition, and dripping did not occur even after 900 seconds of exposure.

It is shown from this test that the drip-retarding effect of microfibrillar poly(tetrafluoroethylene) is present regardless of whether heavy char formation takes place. The above tests indicate that the compositions of the present invention will resist dripping or sagging during real, large-scale fire conditions, which involve a combination of large radiant heat flow and flames.

Obviously, other modifications and variations of the present invention are possible in the light of the above description. It is, therefore, to be understood that changes may be made in the particular embodiments disclosed herein which are within the full intended scope of the invention as defined in the appended claims.

We claim:

1. A drip-retardant, plasticized thermoplastic composition which comprises, in admixture:
   (a) a polyphenylene ether resin;
   (b) a plasticizer in an amount at least sufficient to provide a plasticized composition after molding, said amount being sufficient to lower the temperature required to extrude the composition by at least 50° to 100° F. in comparison with the corresponding composition without the plasticizer; and
   (c) a microfibrillar poly(tetrafluoroethylene) resin in an amount at least sufficient to render said thermoplastic composition non-dripping when molten.

2. A composition as defined in claim 1 wherein the polyphenylene ether resin (a) has the formula:

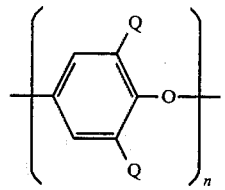

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

3. A composition as defined in claim 2 wherein the polyphenylene ether resin (a) is poly(2,6-dimethyl-1,4-phenylene)ether.

4. A composition as defined in claim 1 wherein the plasticizer (b) is a compound of the formula:

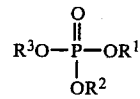

wherein $R^1$, $R^2$ and $R^3$ are the same or different and are alkyl, cycloalkyl, aryl, alkyl substituted aryl, aryl substituted alkyl, hydroxyalkyl, hydroxyaryl, hydroxyalkaryl, halogen, haloaryl and hydrogen.

5. A composition as defined in claim 4 wherein said plasticizer (b) is an aromatic phosphate plasticizer.

6. A composition as defined in claim 5 wherein said aromatic phosphate is triphenylphosphate.

7. A composition as defined in claim 1 wherein said microfibrillar poly(tetrafluoroethylene) resin is present from about 0.1 to about 5 parts by weight, based on the combined weight of (a) and (b).

8. A composition as defined in claim 1 which includes an impact modifier.

9. A composition as defined in claim 8 wherein the impact modifier is an A-B-$A^1$ block copolymer wherein terminal blocks A and $A^1$ are polymers of a vinyl aromatic compound and center block B is a polymer of a conjugated diene.

10. A composition as defined in claim 9 wherein said A-B-$A^1$ block copolymer is a styrene-butadiene-styrene block copolymer.

11. A composition as defined in claim 9 wherein said A-B-A¹ block copolymer is a hydrogenated A-B-A¹ block copolymer.

12. A composition as defined in claim 11 wherein said hydrogenated A-B-A¹ block copolymer is a hydrogenated styrene-butadiene-styrene block copolymer.

13. A composition as defined in claim 8 wherein the impact modifier is a rubber modified, high impact polystyrene.

14. A composition as defined in claim 1 which includes a flame retardant amount of a flame retardant agent.

15. A composition as defined in claim 1 in which said plasticizer (b) is a flame retardant agent and is present in a flame retardant amount.

* * * * *